United States Patent
Venkataswamy et al.

(10) Patent No.: US 6,544,909 B1
(45) Date of Patent: Apr. 8, 2003

(54) SINGLE PLY REINFORCED ROOFING MEMBRANE

(75) Inventors: Krishna Venkataswamy, Sparta, NJ (US); Krishna Srinivasan, Mahwah, NJ (US); Li-Ying Yang, Whippany, NJ (US)

(73) Assignee: Building Materials Investment Corporation, Wilmington, DE (US)

( * ) Notice: Subject to any disclaimer, the term of this patent is extended or adjusted under 35 U.S.C. 154(b) by 51 days.

(21) Appl. No.: 09/591,593

(22) Filed: Jun. 9, 2000

(51) Int. Cl.$^7$ ................................................ B32B 27/12

(52) U.S. Cl. ............................. 442/38; 442/41; 442/43; 442/45; 428/58; 428/141; 428/220; 428/297.4; 428/300.7; 428/500; 428/516

(58) Field of Search .................................. 428/516, 500, 428/220, 141, 300.7, 297.4, 57, 58; 442/38, 41, 43, 37, 45

(56) References Cited

U.S. PATENT DOCUMENTS

| | | | | | |
|---|---|---|---|---|---|
| 4,126,721 | A | * | 11/1978 | Vitt .............................. | 428/339 |
| 4,435,466 | A | * | 3/1984 | Kuhnel et al. ............... | 428/215 |
| 4,656,094 | A | * | 4/1987 | Kojima et al. ............... | 428/412 |
| 5,061,572 | A | * | 10/1991 | Hamada et al. .............. | 428/516 |
| 5,340,642 | A | * | 8/1994 | Baumgartl et al. .......... | 428/224 |
| 5,367,022 | A | * | 11/1994 | Kiang et al. ................. | 428/516 |
| 5,643,989 | A | * | 7/1997 | Van De Grampel et al. ............................ | 524/494 |
| 5,654,104 | A | * | 8/1997 | Yoshizaki et al. ........... | 428/461 |
| 5,950,541 | A | * | 9/1999 | Tabor et al. ................. | 428/373 |
| 6,235,658 | B1 | * | 5/2001 | Panzer et al. ................. | 442/62 |

* cited by examiner

Primary Examiner—Paul Thibodeau
Assistant Examiner—Monique R. Jackson
(74) Attorney, Agent, or Firm—Walter Katz; William J. Davis; Marilyn J. Maue

(57) ABSTRACT

A single ply reinforced roofing membrane having advantageous tensile and seam strength comprising a reinforcement scrim sandwiched between polyolefin cap and base layers, characterized in that at least one of said layers includes a functional polyolefin as additive therein.

1 Claim, No Drawings

SINGLE PLY REINFORCED ROOFING MEMBRANE

BACKGROUND OF THE INVENTION

1. Field of the Invention

This invention relates to single ply reinforced roofing membranes for covering industrial and commercial flat roofs, and, more particularly, to such membranes having significantly improved tensile and seam strength properties.

2. Description of the Prior Art

Heat-sealable, reinforced polyolefin-based single ply roofing membranes are composed of base (bottom) and cap (top) polyolefin-based sheets (layers) with a fiber reinforcement scrim (middle) sandwiched between the other two layers. The scrim is the strongest layer in the composite. In order to fully realize the reinforcement properties of the scrim in such a laminate composite, however, it is necessary that excellent adhesion exist between the polyolefin sheets and the scrim. Unfortunately, due to the inherent incompatibility of scrim materials and polyolefins, only relatively poor interfacial adhesion exists between the scrim and polyolefin sheets. As a result, the roofing membrane is observed to have only low tensile and seam strength properties.

Accordingly, it is an object of this invention to modify the surface characteristics of one or both of the polyolefin-based layers in order to improve the interfacial bonding between polyolefin and scrim thus proving roofing membranes having enhanced membrane tensile and seam strengths.

This and other objects and features of the invention will be made apparent from the following description thereof.

SUMMARY OF THE INVENTION

In this invention, a small amount of a highly-flowable, functional-polyolefin is incorporated into one or both polyolefin-based roofing sheets of a single ply roofing membrane to modify the surface polarity of the polyolefin sheets therein. The resulting composite membrane of the invention exhibits substantially improved adhesion between the reinforcement scrim and the polyolefin sheets. As a result, the tensile and seam strengths of the membrane is advantageously increased.

DETAILED DESCRIPTION OF THE INVENTION

In accordance with the invention, there is provided a single ply reinforced roofing membrane having significantly improved tensile and seam strengths. The membrane comprises a reinforcement scrim sandwiched between polyolefin cap and base layers, and is particularly characterized in that at least one of these layers includes a functional-polyolefin as additive therein. The thickness of the membrane preferably ranges from 5 to 200 mils, more preferably from 35–90 mils.

Suitably the single ply reinforced roofing membrane of the invention includes about 0.5–20% by wt. of the functional-polyolefin additive in one of said layers, preferably about 1–10%, and most preferably about 1–5%.

The functional polyolefin additive is suitably selected from polyolelfins which have been modified with one or more functional groups, such as carboxyl. epoxy, anhydride, amine, ester, (meth)acrylate and succinimide groups.

These functional groups can affect the surface of the polyolefin sheets so that it can adhere better to the scrim material. A maleic anhydride-modified polyolefin (CK Witco), an epoxy-modified polyethylene (Elf Atochem) and methyacrylate terpolymers thereof (Elf) are preferred.

Suitable polyolefins are polymers such as polyethylene, polypropylene, terpolymers of ethylene, propylene and diene monomers, ethylene-propylene copolymers, ethylene-butene copolymers, ethylene-hexene copolymers, ethylene-octene copolymers, propylene-$C_{4-8}$ alpha-olefin copolymers, metallocene polyolefins and the like.

A preferred functional polyolefin for use herein is maleic anhydride-modified polypropylene sold by CK Witco.

The invention will now be described in more detail with reference to the following examples.

STANDARD EXAMPLE

Cap (top) and base (bottom) sheets (layers) of a standard single ply reinforcement polyolefin roofing membrane was made of 100 parts of polyolefin resins, including conventional ingredients, such as 0–80 parts of fire retardant, 0–20 parts of processing oil, ingredients zinc oxide, UV and thermal stabilizers, carbon black, titanium dioxide and calcium carbonate, as is well known in the art. The ingredients were mixed in an extruder at 200° C. and sheeted to a thickness of about 20–30 mils. A reinforcement scrim then was inserted between the top and bottom sheets, and the three layers were pressed into a 45 mil reinforced single ply membrane. The standard membrane then was tested for tensile strength and seam strength.

Invention Example 1

The top sheet of the polyolefin roof membrane was made of the same ingredients as described in the Standard Example. In this example, however, the bottom polyolefin sheet, was admixed with 3 parts by weight of maleic anhydride-polypropylene (CK Witco) before pressing. Then, as usual, the compositions were mixed in an extruder at 200° C. and sheeted to thicknesses of about 20–30 mils. Then a reinforcement scrim was inserted between the top and bottom sheets and the three layers were pressed into a 45 mil single ply reinforced membrane. The resulting membrane was tested for tensile strength and seam strength.

Invention Example 2

Example 1 was repeated except that 2.5 parts by weight of maleic anhydride-polypropylene additive was included in the top sheet of the membrane.

Invention Example 3

Example 1 was repeated except that 1 part of the additive was provided in the bottom layer.

Example 4

Example 1 was repeated except that 5 parts by weight of the additive was present in the bottom layer.

Test Results

The tensile and seam strengths of the membranes of Invention Example 1–4, and the Standard Example are given in the Table below.

TABLE

| Example No. | Tensile Strength,* (psi) | Seam Strength** (lbs/in) |
|---|---|---|
| Standard | 2047 | 107 |
| 1 | 3431 | 160 |
| 2 | 3288 | 146 |
| 3 | 3018 | 137 |
| 4 | 3823 | 141 |

*within membrane
**between membranes on roof

This results show that substantial increases in tensile and seam strength are achieved in the invention Examples when the functional polyolefin additive was present in either the bottom or the top layers, as compared to the Standard Example, without additive.

While the invention has been described with particular reference to certain embodiments thereof, it will be understood that changes and modification may be made which are within the skill of the art. Accordingly, it is intended to be bound only by.the following claims, in which:

What is claimed is:

1. A single ply reinforced roofing membrane comprising a reinforcement scrim sandwiched between cap and base layers which are pressed into a single ply membrane with a thickness of 35–90 mils, characterized in that said layers both are made of ethylene-butene copolymers, with at least one including 1–5 wt. % of maleic anhydride-modified polypropylene as additive therein, said membrane having a tensile strength of 3,018–3,823 psi, and a seam strength of 137–160 lbs/in.

* * * * *